Figure 1:
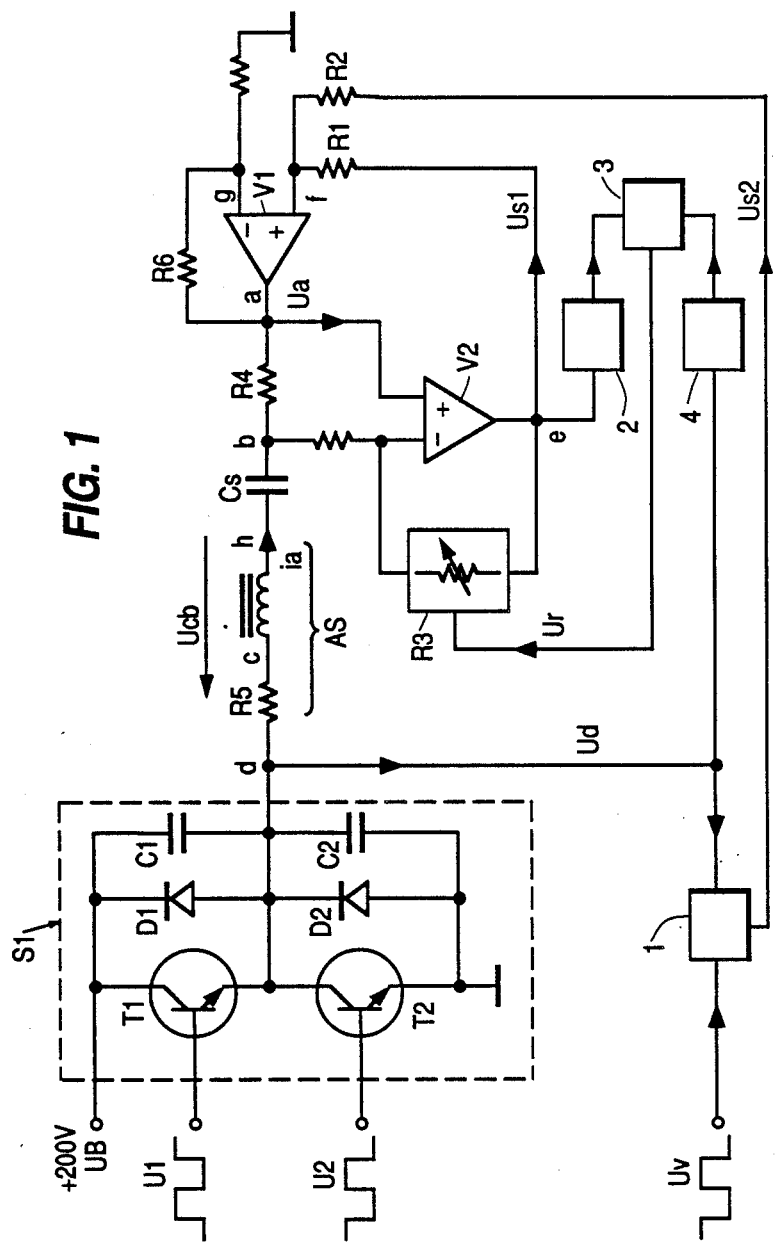

United States Patent [19]

Rilly

[11] Patent Number: 4,956,585
[45] Date of Patent: Sep. 11, 1990

[54] LINE DEFLECTION CIRCUIT FOR A PICTURE TUBE

[75] Inventor: Gérard Rilly, Unterkirchnach, France

[73] Assignee: Deutsche Thomson-Brandt GmbH, Villingen-Schwenningen, Fed. Rep. of Germany

[21] Appl. No.: 411,486

[22] PCT Filed: Mar. 29, 1988

[86] PCT No.: PCT/EP88/00259
§ 371 Date: Oct. 27, 1989
§ 102(e) Date: Oct. 27, 1989

[87] PCT Pub. No.: WO88/07799
PCT Pub. Date: Oct. 6, 1988

[30] Foreign Application Priority Data

Apr. 2, 1987 [DE] Fed. Rep. of Germany ....... 3711173

[51] Int. Cl.$^5$ .................. H01J 29/56; H01J 29/70; H01J 29/72
[52] U.S. Cl. .................. 315/371; 315/387; 315/395
[58] Field of Search ............... 315/387, 371, 395, 396, 315/408, 370

[56] References Cited

U.S. PATENT DOCUMENTS 4,672,449  6/1987  Kraus et al. .................. 358/148
4,680,599  7/1987  Wertz et al. .................. 340/744

FOREIGN PATENT DOCUMENTS 0055148  6/1982  European Pat. Off. .
0175409  3/1986  European Pat. Off. .
0200116  11/1986  European Pat. Off. .
0200116  11/1986  European Pat. Off. .

OTHER PUBLICATIONS

Symmetric Line Deflection for Colour TV Receivers with Enhanced Picture Quality, Une E. Kraus, IEEE Transactions, vol. CE31, No. 3, Aug. 1985, pp. 255-261.

Primary Examiner—Gregory C. Issing
Attorney, Agent, or Firm—Joseph S. Tripoli; Joseph J. Laks; Harvey D. Fried

[57] ABSTRACT

A line deflection circuit for a picture tube, for generating a symmetric deflection current in a deflection or sweeping coil and a tangential capacitor comprises: an active switch for supplying a near square wave shaped output voltage to one end of the deflection coil, at half line frequency and at a keying ratio of 1:1; and, an amplifier having an output coupled to the other end of the deflection coil and having a control input responsive to at least one of first and second corrective variables to assure linearity of a deflection current flowing through the deflection coil and line centered zero crossing of the detection current. The first corrective variable is proportional to the deflection current through the deflection coil and the second corrective variable is related to a deviation of the output of the switch from the square wave shape. The circuit may also comprise a timing comparator for determining each zero crossing relative to immediately preceding and following edges of the output voltage. A control potential may be derived therefrom for controlling a gain factor of the amplifier. The active switch may comprise a potential divider.

9 Claims, 2 Drawing Sheets

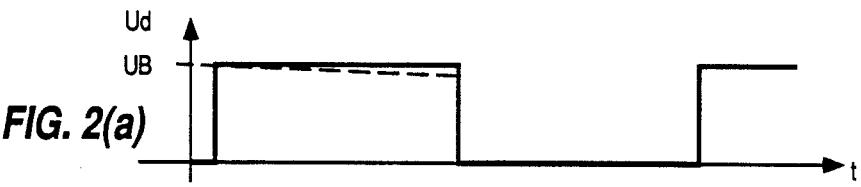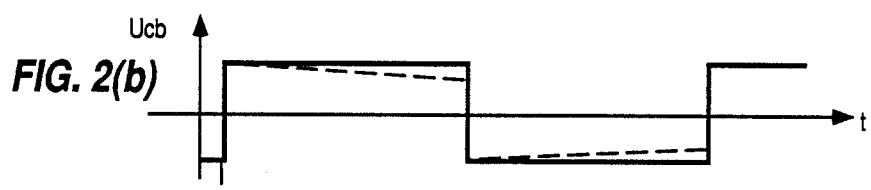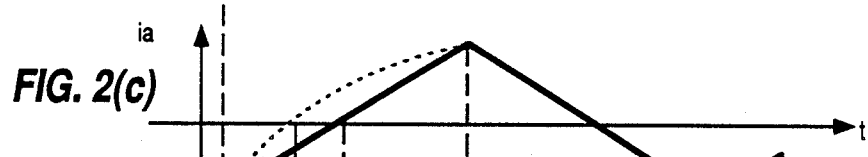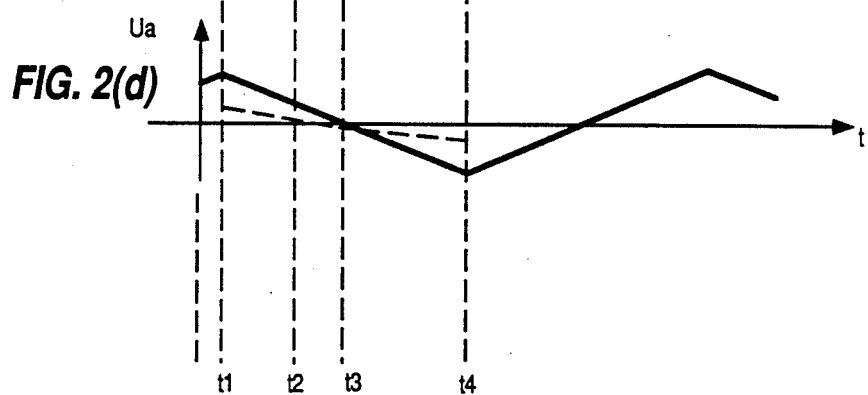

LINE DEFLECTION CIRCUIT FOR A PICTURE TUBE

The invention relates to the field of deflection circuits for picture tubes, and in particular, to deflection circuits for generating symmetric deflection currents.

In a conventional line deflection circuit for a picture tube, for example in a television receiver or a monitor, the electron beam is deflected from the left edge of the picture to the right during the forward trace sweep time of a line. The forward trace is followed by a retrace interval during which the electron beam returns to the left edge of the picture at high speed. The rapid change of the deflecting current during the retrace interval creates a relatively high voltage peak at the horizontal scan output transistor and the line sweeping or deflection coil. The voltage peak must be taken into consideration in choosing the capacity of these parts.

Television systems with enhanced resolution, for example in high definition television (HDTV), have an increased number of scan lines and correspondingly reduced line duration. The demands of more scan lines and faster line scanning can cause problems. These problems include: a need for increased performance, for example switching speed; a higher retrace voltage at the horizontal scan output transistor and at the line sweeping or deflection coil; and, increased sweep radiation.

It is known (IEEE Transactions on Consumer Electronics, Vol. CE-31, No. 3, Aug. 1985, pages 255 through 261) to operate in such systems with enhanced resolution by means of bidirectional, for example symmetrical, line deflection. During bidirectional line deflection, the electron beam for writing a line is deflected from the left edge of the picture to the right, and subsequently, without retracing, deflected from the right edge of the picture to the left edge, for writing the next line at the same speed. Thus, the rapid retrace of the prior art, from the right edge of the picture to the left, and the consequent problems resulting from the fast change of the deflecting current do not occur. Bidirectional deflection is also advantageous in that the power loss and the sweep radiation of the line deflecting circuit are reduced. In a symmetrical deflection circuit, for example, the deflection current has a triangular shaped waveform, which changes from a negative value to a positive value during one line and from the positive value to the negative value during the following line. The deflecting current can, in an approximation to a triangular shaped waveform, be a sinusoidal waveform. In the triangular waveform, as well as in the sinusoidal waveform, the peaks of the deflection current always occur between successive scan lines, beyond the boundaries of the screen, whereas the zero crossings of the deflection current occur at the center of each scan line.

A deflection current with a triangular shaped waveform may be obtained by applying a square wave shaped voltage waveform of half the line frequency to the deflection coil via a suitable circuit. Ideally, the square wave shaped voltage generates a triangular shaped current in the deflection coil. The positive voltage portion of the square wave produces the positive sloped portion of the triangular waveform, whereas the negative voltage portion of the square wave produces the negative sloped portion of the triangular waveform. The zero crossing of the deflecting current is always located in the line center and the deflecting current runs in a symmetrical way, with reversed sign in both halves of the line forward trace sweep time before and after the zero crossing.

The deflection current is subject to ohmic resistance, particularly for example, the inevitable ohmic resistance of the deflection coil. Accordingly, the desired waveform shape of the ideal deflecting current is not always achieved in practice. As a result, the zero crossing of the deflecting current during a line may not be in the center of the line, and the halves of each waveform during each period may be curved differently, that is, not symmetric. Thus, errors in the pattern and the luminance of the picture shown are created in picture reproduction.

It is an aspect of the invention to minimize the described deviation of the deflection current from the desired waveform shape by simple electronic means. In accordance with this aspect of the invention, a line deflection circuit for a picture tube, for generating a deflection current in a deflection coil and a tangential capacitor, comprises: an active switch for supplying a near square wave shaped output voltage to one end of the deflection coil, at a predetermined duty cycle, for example, at half line frequency and at a keying ratio of 1:1; and, an amplifier having an output coupled to the other end of the deflection coil and having a control input responsive to at least one of first and second corrective variables to assure linearity of a deflection current flowing through the deflection coil and line centered zero crossing of the deflection current. The first corrective variable is proportional to the deflection current through the deflection coil and the second corrective variable is related to a deviation of the output voltage of the switch from the square wave shape.

In one embodiment, the magnitude of the deviating current is detected by a resistor or by detecting the voltage causing the deflection at the deflection coil. This solution is based upon the fact that the deviations from the described desired position can be recognized from these two values. Corrective variables can also be derived from these values. The corrective variables can control the deflecting current by means of the amplifier under a feedback or control circuit principle in such a way that the deflecting current assumes the desired waveform shape. The amplifier can correct the deflecting current responsive to the deviations in the deflecting current, responsive to the voltage applied to the deflection coil, or responsive to both.

In accordance with a further aspect of the invention, the zero crossing of the deflecting current with respect to output voltage pulses is detected. An additional control voltage is derived from the deviation of the zero crossing from the center of the output voltage pulse. The additional control voltage also controls the amplification of the voltage proportional to the deflecting current. This corrective variable is particularly effective for correcting deviations in the zero crossing position of the deflecting current due to the influence of temperature changes. The additional control voltage is not a dynamic control voltage which changes in the course of one line, but a slowly changing control signal in the nature of a direct current signal.

The zero crossing may be measured, for example, by an up/down counter, counting in one sense during the time from each leading edge of an output voltage pulse to the next zero crossing and counting in an opposite sense during the time from the zero crossing to the trailing edge of the output voltage pulse. A control potential is determined by the value of the counter at each trailing edge.

The invention is illustrated in the drawings, wherein:

FIG. 1 is a diagram of a deflecting circuit in accordance with the invention; and, FIGS. 2(a) to 2(d) are waveforms illustrating the operation of the circuit shown in FIG. 1.

With reference to FIG. 1, two power transistors T1, T2 are coupled in a push pull configuration. The power transistors are controlled by two switching voltages U1 and U2 in such a way that the power transistors conduct alternately, developing an output voltage signal at a predetermined duty cycle. At a line frequency of 32 kHz, the switching voltages U1 and U2 are of half the line frequency, that is, 16 kHz. Each one-half wave of the switching voltages U1 and U2 is equal to one line duration. Diode D1 and capacitor C1 are coupled in parallel with transistor T1. Diode D2 and capacitor C2 are coupled in parallel with transistor T2. Free running diodes D1, D2 and capacitors C1, C2 are used for temporary current transfer. Components T1, C1, D1, T2, C2, and D2 make up a high tension switch S1. The output d of switch S1 is connected, alternating from line to line, to ground and to the operating voltage UB, which equals 200 volts. At the point d, which represents the output of the switch S1 and the input of a deflection coil AS, a half line frequency voltage Ud is also created. Resistor R5 represents the ohmic part of the deflection coil AS. Capacitor Cs is a tangential capacitor used for direct current decoupling and tangential correction, also referred to as S-shaping. The right terminal or end b of capacitor Cs is not grounded, but is connected to the output a of an amplifier V1 through a current sampling resistor R4.

FIG. 2 shows the voltage and current waveforms corresponding to operation of the circuit shown in FIG. 1. FIG. 2(a) shows the voltage Ud at the output of switch S1. FIG. 2(b) shows the voltage Ucb, between points c and b. FIG. 2(c) shows the current ia flowing through the deflection coil AS. For purposes of illustration, current ia is shown without regard to the effect of S-shaping on its configuration. FIG. 2(d) shows the voltage Ua at the output of amplifier V1. For each of the waveforms, from time t1 to time t4, the ideal waveforms are represented by solid lines. The dashed lines shows the actual waveforms, deviating from the ideal waveforms, as occurs in practice without corrective measures.

The voltage Ucb between the points c and b, which determines the value of the deflecting current ia, is characterized by the drop indicated by the dashed line due to the drop in voltage over the resistors R4 and R5. The voltage drop across resistors R4 and R5 causes a voltage drop across deflection coil AS. A resulting change in the slope of current ia results in a deviation from the ideal waveform, for example as shown by the dashed line in FIG. 2(c). The deflection circuit in accordance with the invention, and shown in FIG. 1, comprises three corrective means for achieving the ideal waveform path for the current ia, shown by the solid line in FIG. 2(c). Each of these means is described hereinafter.

CORRECTION BY MEANS OF THE DEFLECTING CURRENT

The voltage between the points b and a, which is proportional to the deflecting current ia, is fed to the inputs of a difference amplifier V2. At the point e, a voltage is developed proportional to the deflecting current ia. This voltage forms a corrective variable Us1, which is coupled to an input f of the amplifier V1 through resistor R1. Amplifier V1 operates as an analog linear amplifier, having a negative feedback path formed by resistor R6. The corrective variable Us1 changes the voltage Ua at the point a, corresponding to the actual deflecting current ia. The deflecting current ia has the desired waveform shape when the voltage Ucb, through the inductance of the deflection coil AS and the capacitance of Cs, has an exactly square shaped waveform, that is, when voltage Ucb is always constant during the duration of one line. However, the ohmic resistance of the deflection coil, present in the pathway of the deflecting current ia, prevents this ideal condition. The voltage Ua at the point a is controlled by the corrective variable Us1, as corrective variable Us1 assures that the voltage Ucb is exactly square shaped. Accordingly, voltage Ucb always has a constant value during the duration of one line and does not drop as shown by the dashed line. Corrected voltage Ua, as shown by the dashed line in FIG. 2(d), is thus generated at point a by amplifier V1.

The voltage Ua compensates for the voltage drop of the voltage Ucb represented by the dashed line. This is a negative feedback process at the point a in the sense that the deflecting current ia corrects itself. The corrective variable Us1 is a dynamic corrective variable which always changes in the course of the duration of one line. The corrective variable Us1 may also be coupled through a pulse former or a harmonic generator which always changes the path of the corrective variable Us1 during one line, effecting a flawless correction of the deflecting current. The desired path of the deflecting current ia means that current ia has its zero crossing in the center of the line and runs symmetrically in a mirror image way, with reversed sign in both halves of the line, before and after the zero crossing.

CORRECTION BY MEANS OF THE SWITCH OUTPUT VOLTAGE

The voltage Ud present at the point d is fed to a comparator stage 1 which is also receives a reference voltage Uv with an exactly square shaped waveform at half the line frequency. The deviation between Uv and Ud is determined in comparator stage 1. A corrective variable Us2 is derived from this deviation, which represents the undesired drop of voltage Ud always during one line period. Such a drop in the voltage would also compromise the deflecting current ia. The corrective variable Us2, via the resistor R2, also acts upon the input f of the amplifier V1 cumulatively with the corrective variable Us1. Corrective variable Us2 is also capable of changing the voltage Ua during one line period in such a way that the deflecting current ia has the desired path during the line period. The corrective variable Us1 and Us2 can be used for the correction of the deflecting current ia each one independently, or as shown, both at the same time.

CORRECTION BY MEANS OF THE ZERO CROSSING

The voltage at point e, which is proportional to the deflecting current ia, is also fed to the zero crossing detector 2, that is, where signal values change from positive to negative values and from negative to positive values. The output of zero crossing detector 2 is fed to a time comparator stage 3. In addition, the voltage Ud is fed to zero crossing detector 4, which detects the edges of pulses in Ud and feeds the result to the time comparator 3. The zero crossing detector 4, for example, responds at a voltage value Ud=UB/2=100 V which, in practice, is in the middle of the duration of the edge of Ud. The rate of change of this edge is reduced by capacitors C1 and C2.

The zero crossings of ia and the impulse edges of Ud are compared as to their position in time by time comparator stage 3. At the time t1 of the edge of Ud in stage 3, a counter is started which counts in one sense, for example upwardly in the positive direction. At the time t2 or t3 of the zero crossing of ia, the counter is stopped and operated in the opposite sense, for example downwardly, from time t2 or t3 respectively, to time t4, that is, until the next edge of Ud appears. If the zero crossing of ia lies at time t3, that is at the center of the line period from times t1 to t4, the counting result at time t4 is zero and the control potential Ur is also zero. If, through a drop in the voltage Ud and/or the voltage Ucb, as shown by the dashed line, the current assumes the course of the dashed line, its zero crossing t2 is shifted from the desired zero crossing at time t3. The counter is incremented upwardly between times t1 and t2 and said downwardly between times t2 and t4. Because the interval from time t1 to t2 is smaller than the interval from t2 to t4 the result of counting is negative. The control potential Ur thus generated is changed in the negative direction. The control potential Ur controls the variable resistor R3, which varies the feedback path resistance of amplifier V2 and therefore the amplification of amplifier V2. The voltage at the point a is changed in the sense that the current again resumes its zero crossing at the desired time t3. When the zero crossing at time t2 is later than time t3, respectively, Ur becomes positive and changes the resistor R3 in the reverse direction. The control by Ur thus assures that the zero crossing of ia is always, as desired, at time t3, that is in the center of the line. If these conditions are fulfilled it can be assumed that the current ia follows the desired path, symmetrical to the zero crossing t3.

Voltage Ur is a direct current-wise control potential which causes a slow adjustment. It is particularly used to compensate for deviations in the zero crossing of ia due to temperature changes, especially changes of the values of R4 and R5 in the sense of a long term adjustment. The voltage Ua represented by the solid line in FIG. 2(d) is the voltage responsible for the flawless correction of the deflecting current ia at point a, that is, for the waveform shown as a solid line. The shape of Ua represented by the dashed line is valid for the case that the compensation of Ua is insufficient and the deflecting current ia assumes the dashed path.

Until now, it has been assumed that the operating voltage UB is constant at +200 volts. Voltage UB can additionally be amplitude modulated in order to obtain an adjustment of the deflection pattern. The line deflecting current may be modulated to correct for East/West distortion, for example by the vertical frequency deflecting voltage. In that case, the amplitude of the deflecting current ia would also be modulated at the vertical frequency, for the East/West adjustment of the deflection pattern.

The voltage Ua at the point a, the voltage acting at the deflection coil AS and the deflecting current ia are thus adjusted on the basis of three criteria: one being dynamic and dependent upon ia itself by means of the corrective variable Us1; the second being dynamic and dependent on the voltage Ud applied to the deflection coil AS by means of the corrective variable Us2; and, the third being static and dependent upon the position of the zero crossing of the current ia by means of the control potential Ur.

Commercially known fast comparators, of the type LM2901 available from Motorola, can be used for the stages 1 through 4 shown in FIG. 1.

What is claimed is:

1. A line deflection circuit for a picture tube, for generating a deflection current in a deflection coil and a tangential capacitor, said deflection circuit comprising:
   an active switch for supplying a near square wave shaped output voltage to one end of said deflection coil, at half line frequency and at a keying ratio of 1:1; and,
   an amplifier having an output coupled to the other end of said deflection coil and having a control input responsive to at least one of first and second corrective variables to assure linearity of a deflection current flowing through said deflection coil and line centered zero crossing of said deflection current, said first corrective variable being representative of said deflection current through said deflection coil and said second corrective variable being related to a deviation of said output voltage from said square wave shape.

2. The circuit of claim 1, comprising:
   a sum and difference amplifier for supplying said first corrective variable; and,
   a resistor carrying said deflection current and having ends respectively coupled to inputs of said amplifier.

3. The circuit of claim 2, comprising means for determining each said zero crossing relative to immediately preceding and following edges of said output voltage, and deriving a control potential therefrom for controlling a gain factor of said amplifier.

4. The circuit of claim 3, comprising an up/down counter, counting in one sense during the time from each said preceding edge to the next zero crossing and counting in an opposite sense during the time from said next zero crossing to the next following edge, said control potential being determined by the value of the counter at each said following edge.

5. The circuit of claim 1, wherein an operating voltage for said active switch is amplitude modulated for adjusting said deflection current to correct for east west distortion.

6. The circuit of claim 1, wherein said active switch comprises an active potential divider.

7. The circuit of claim 1, wherein said first corrective variable is proportional to said deflection current.

8. A deflection circuit, for generating a bidirectional deflection current in a deflection coil, comprising:
   an active switch for supplying a generally rectangular wave shaped output voltage of predetermined duty cycle to said deflection coil;
   an amplifier having an output coupled to said deflection coil and having a control input responsive to at least one corrective variable to provide correction of said deflection current in accordance with said corrective variable; and,
   means for generating said corrective variable in accordance with a deviation of said output voltage from a reference rectangular wave voltage.

9. A bidirectionally scanning deflection circuit, comprising:
a deflection winding;
an output stage coupled to said deflection winding for generating a bidirectional scanning current therein;
means for generating a control signal indicative of a zero-crossing of said scanning current; and,
a control circuit coupled to said output stage and responsive to said control signal for modifying said scanning current to control said zero-crossing in accordance with said control signal.

* * * * *